United States Patent
Kockmann et al.

(10) Patent No.: US 6,909,737 B1
(45) Date of Patent: Jun. 21, 2005

(54) METHOD AND DEVICE FOR TRANSMITTING INFORMATION USING VARYING CARRIER FREQUENCIES BY MEANS OF A FREQUENCY HOPPING METHOD

(75) Inventors: Jürgen Kockmann, Gronau (DE); Olaf Dicker, Rees (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/719,969
(22) PCT Filed: Jun. 18, 1998
(86) PCT No.: PCT/DE98/01681
§ 371 (c)(1),
(2), (4) Date: Feb. 6, 2001
(87) PCT Pub. No.: WO99/66650
PCT Pub. Date: Dec. 23, 1999

(51) Int. Cl.$^7$ .............................. H04B 1/69; H04B 1/713
(52) U.S. Cl. ........................................ 375/133; 375/202
(58) Field of Search ................................ 375/133, 275, 375/285, 202, 259, 272, 364

(56) References Cited

U.S. PATENT DOCUMENTS

| | | | |
|---|---|---|---|
| 4,716,573 A | | 12/1987 | Bergström et al. |
| 5,471,503 A | | 11/1995 | Altmaier et al. |
| 5,515,369 A | | 5/1996 | Flammer, III |
| 5,629,875 A | * | 5/1997 | Adair, Jr. ................ 702/122 |
| 5,838,717 A | * | 11/1998 | Ishii et al. ................ 375/131 |
| 5,898,733 A | * | 4/1999 | Satyanarayana ........... 375/133 |
| 6,014,406 A | * | 1/2000 | Shida et al. .............. 375/133 |

FOREIGN PATENT DOCUMENTS

| | | | |
|---|---|---|---|
| DE | 34 15 032 A1 | 11/1984 | |
| EP | 0 182 762 | 5/1986 | |
| EP | 0182762 | * 5/1986 | ............ H04K/1/00 |
| WO | WO 96/00467 | * 1/1996 | ........... H04B/15/00 |

* cited by examiner

*Primary Examiner*—Amanda T. Le
*Assistant Examiner*—Cicely Ware
(74) *Attorney, Agent, or Firm*—Bell Boyd & Lloyd LLC

(57) ABSTRACT

A method and an apparatus transmits information in various carrier frequencies with frequency hopping. A table 25 with a plurality of n possible carrier frequency values fx in addresses 1 through N of the table 25 is thereby offered. Further, a sequence of random values is generated, for example in a random number generator 22, on the basis whereof a part M of the N carrier frequency values fx is read from the corresponding addresses of the table 25, whereby M≦N applies. Information is subsequently transmitted in the corresponding carrier frequencies. The inventive apparatus or, respectively, the inventive method can be implemented, for example, in a mobile station and/or a base station of a mobile radiotelephone system.

10 Claims, 5 Drawing Sheets

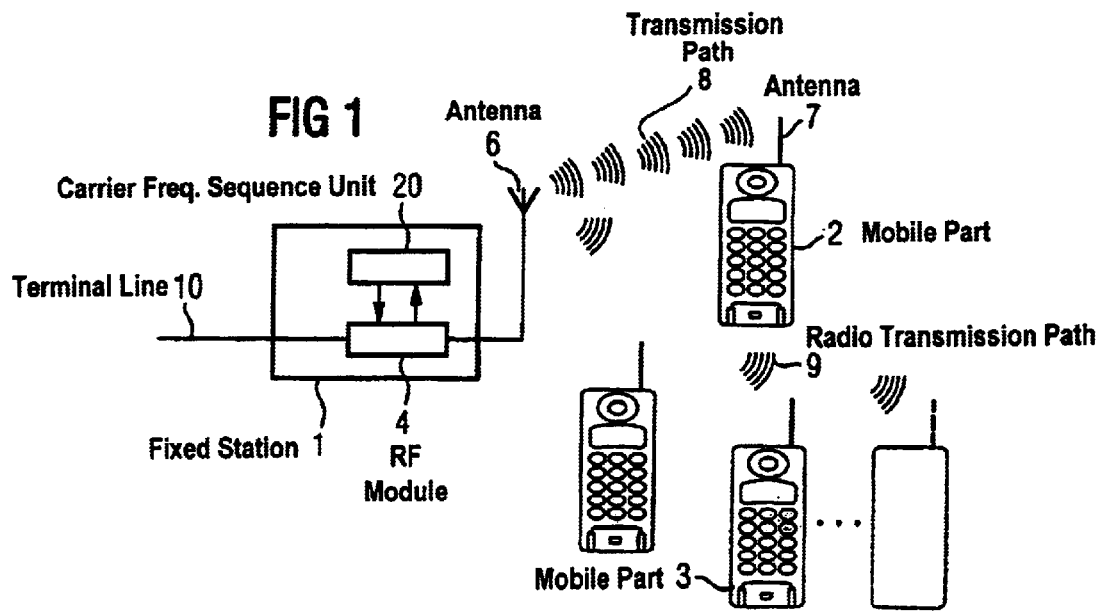
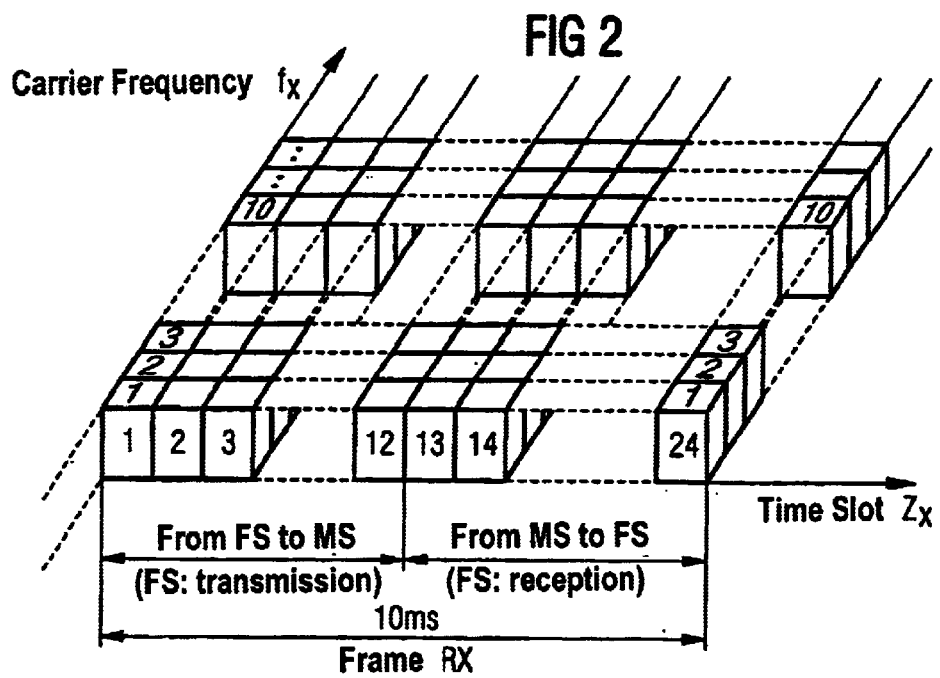

METHOD AND DEVICE FOR TRANSMITTING INFORMATION USING VARYING CARRIER FREQUENCIES BY MEANS OF A FREQUENCY HOPPING METHOD

PRIORITY

The present application is a national stage entry under 35 U.S.C., Section 371 of International Application PCT/DE98/01681 filed Jun. 18, 1998.

BACKGROUND OF THE INVENTION

1. Field of the Invention

The present invention is directed to a method and to an apparatus for the transmission of information in various carrier frequencies with a frequency hopping method that can be implemented, for example, in a mobile station and/or a base station of a mobile radiotelephone system.

2. Description of the Related Art

What is referred to as the frequency hopping spread spectrum system is known as a method for the transmission of data. What is thereby to be understood by a frequency hopping spread spectrum system is a system wherein a plurality of carrier frequencies are offered for the radio transmission of data, and the carrier frequency currently which is employed is changed at periodic intervals. Particularly given a time-division multiplex system (TDMA), a change of the carrier frequency can ensue after every time slot of the time frame of the time-division multiplex transmission. Such a frequency hopping spread spectrum system has advantages to the effect that the energy of the entire radio transmission is distributed over all carrier frequencies. This is particularly advantageous when a generally available frequency band such as, for example, the 2.4 GHz ISM (industrial, scientific, medical) band is employed. According to the applicable regulations (FCC part 15 in the USA), an upper limit for the maximally occurring energy per carrier frequency is defined for this frequency band in order to keep interference with other subscribers as low as possible. It is. prescribed for the frequency change that at least 75 different frequencies must be used within a time span of 30 seconds. Further, each frequency may be used for a maximum of 0.4 seconds in 30 seconds. All frequencies must be used equally distributed on time average.

24 time slots, respectively 12 for uplink and for downlink, are defined in a 10 ms frame in the Digital Enhanced Cordless Telecommunications (DECT) standard. The FCC part 15, however, only makes a bandwidth of less than 1 MHz available in the ISM band. In order to meet this requirement, the plurality of time slots was reduced to 12 time slots in a 10 ms time frame, i.e. respectively 6 time slots for uplink and for downlink.

With 6 time slots for each direction and retaining the DECT time frame of 10 ms, each time slot would exhibit a length of 833 $\mu$s. The time s slots in the DECT standard have a length of 417 $\mu$s. Given a slow frequency hopping system, an inactive DECT time slot of 417 $\mu$s is required between two neighboring, active time slots wherein data is transmitted. In such systems, only 6 active time slots are respectively employed for data transmission in each direction. If such systems that work on the basis of a slow frequency hopping are also to meet the requirements of the FCC part 15 in the ISM band, an inactive blind time slot of 417 $\mu$s must in turn be present between neighboring active time slots. This blind time slot thus has half the length of a full time slot of 833 $\mu$s, as a result whereof—when a base time frame of 10 ms is retained—four active time slots are offered in each frame for the respective uplink and downlink, a blind time slot being respectively transmitted between them. The four active time slots have a respective length of 833 $\mu$s, whereas the blind time slots comprises a respective length of 417 $\mu$s. Given this structure, the frequency programming for the frequency hopping in the next, following active time slot can continue to be implemented at the end of the preceding active time slot. The programmed start frequency in the next active time slot can thereby be set during the blind time slots.

an advantage of the frequency hopping spread spectrum system is that the system becomes more insensitive to disturbances due to the offering of a great plurality of carrier frequencies. Over and above this, the security against tapping by third parties is enhanced in the system, since the third party generally does not know the carrier frequency to which a switch is made after a certain time span.

The sequence of carrier frequencies that are successively employed for the transmission is determined by an algorithm. Such an algorithm is identically implemented in the fixed station as well as in each mobile station of the mobile radiotelephone transmission. When, thus, a mobile part is synchronized with the appertaining fixed station, the mobile part and the fixed station undertakes the carrier frequency change predetermined by the sequence of the algorithm synchronously with one another.

Problems occur when the plurality of usable carrier frequencies is not temporally constant. This, for example, is the case when a carrier frequency recognized as disturbed is blocked during a certain time span and, thus, is not enabled for employment and, for example, is enabled for re-employment after a certain time span. Even given such a plurality of carrier frequencies fluctuating over time, it must be assured that, for example, the aforementioned FCC part 15 rules are adhered to.

European Patent Document EP-A-0 182 762 discloses a method in a telecommunication system having two transmission/reception stations that selects carrier frequencies according to the frequency hopping method, whereby new carrier frequencies are selected from a matrix with available frequencies by generating a sequence of random numbers that reference the position of a respective carrier frequency in the matrix and on the basis of status information for the respective frequency likewise stored in the matrix, so that they can be read out in a next step.

U.S. Pat. No. 5,471,503 discloses a method for sampling a reception signal in a telecommunication working according to the frequency hopping method, whereby each channel checks for an existing transmission.

SUMMARY OF THE INVENTION

An object of the present invention is to create a method and an apparatus for the transmission of information in various carrier frequencies with a frequency hopping method wherein a simple and effective offering of the carrier frequencies is assured.

This object is achieved by a method and an apparatus for the transmission of information in various carrier frequencies with a frequency hopping method the method including the following steps: offering a table with a plurality of n possible carrier frequency value fx in addresses 1 through N of the table; generating a sequence of random values; reading out at least a part M of the N carrier frequency values fx from the corresponding addresses of the table on the basis of the generated sequence of random values, whereby M$\leq$N; and transmitting information in the corresponding carrier frequencies, whereby the following steps are implemented for the setup of a connection: sampling a carrier frequency; deciding whether a message containing at least an initialization information was received on this carrier frequency during a specific time span; when the decision is negative, selecting a new carrier frequency and sampling this new carrier frequency; when the decision is positive, generating the sequence of random values upon employment of the initialization information. The apparatus includes a means for offering a table with a plurality of n possible carrier frequency value fx in addresses 1 through N of the table; a means for generating a sequence of random values; a means for reading out at least a part M of the N carrier frequency values fx from the corresponding addresses of the table on the basis of the generated sequence of random values, whereby M≦N; and a means for transmitting information in the corresponding carrier frequencies, whereby a means for the setup of a connection is provided that comprises: means for sampling a carrier frequency; means for deciding whether a message containing at least an initialization information was received on this carrier frequency during a specific time span; configured such that, when the decision is negative, a new carrier frequency is selected and this new carrier frequency is sampled, and, when the decision is positive, the sequence of random values is generated upon employment of at least the initialization information. Advantageous developments of the present invention are provided in that the generated sequence of random values is converted into address values between 1 and N with which the carrier frequency values are read from the table. The following steps are implemented for the synchronization: sampling a carrier frequency; deciding whether a message was received on this carrier frequency during a specific time span; when the decision is negative, selecting a new carrier frequency and sampling this new carrier frequency; when the decision is positive, generating the sequence of random values upon employment of the message. In a preferred embodiment, a part M of the N possible carrier frequency values is read out from the table, whereby the remaining N-M carrier frequency values are employed for replacing disturbed carrier frequency values of the M carrier frequency values. Specifically, the table is updated from the N-M carrier frequency values before the read-out upon replacement of the carrier frequency values that correspond to disturbed carrier frequencies.

In the preferred apparatus, a means for converting the generated sequence of random values into address values between 1 and N with which the carrier frequency values are read from the table. A means for synchronization is provided that comprises: means for sampling a carrier frequency; means for deciding whether a message containing at least an initialization information was received on this carrier frequency during a specific time span, configured such that, when the decision is negative, a new carrier frequency is selected and this new carrier frequency is sampled, and, when the decision is positive, the sequence of random values is generated upon employment of at least the initialization information. The apparatus includes the means for readout reads a part M of the N possible carrier frequency values from the table, whereby the remaining N-M carrier frequency values are employed for replacing disturbed carrier frequency values of the M carrier frequency values. A means for updating that updates the table from the N-M carrier frequency values before the readout upon replacement of the carrier frequency values that correspond to disturbed carrier frequencies.

According to the invention, a table having a plurality of M possible carrier frequency values fx is offered in addresses 1 through N of the table. Further, a sequence of random values is generated on whose basis at least a part M of the N carrier frequency fx is read out from the corresponding addresses of the table, whereby M≦N applies. Subsequently, information are transmitted in the carrier frequencies corresponding to the carrier frequency values. The inventive apparatus can, for example, be a mobile station or a base station as well of a mobile radio telephone system.

The generated sequence of random values is converted into address values between 1 and N with which the carrier frequency values fx are read from the table.

Advantageously, one carrier frequency is sampled first for setting up a connection, for example between mobile radio telephone units. Then a decision is made as to whether a specific message was received on this carrier frequency during a specific time span. When the decision is negative, a new carrier frequency is selected and this new carrier frequency is sampled. When the decision is positive, the table is initialized and the sequence of random values is generated upon employment of the received, specific message. This is advantageous particularly in a mobile station of a mobile radio telephone system to which a specific message is communicated from a base station, this making it possible for the mobile station to begin the sequence of random values for reading out the carrier frequency values at the address at which the mobile station is likewise located at the moment. Since the same sequence of random values is generated in the mobile station and the base station, the same sequence of carrier frequency values is thus subsequently read out from the table. The same method is employed for synchronizing, for example, mobile radio telephone units since, for example, a mobile station likewise thereby requires a message from the base station on whose basis it can continue to read carrier frequency values from the table at the same location of the random sequence.

Advantageously, only one part M of the possible carrier frequency values is read out from the table, whereby the remaining N-M carrier frequency values are employed for replacing disturbed carrier frequency values of the M carrier frequency values.

When setting up a connection, for example between mobile radio telephone units, or when synchronizing, for example, mobile radio telephone units, can thereby be updated before the readout upon replacement of the carrier frequency values that correspond to the disturbed carrier frequencies from the N-M carrier frequency values. In the case of a mobile station, for example, this can receive a message regarding which carrier frequencies are disturbed from a base station wherein the disturbed carrier frequencies were acquired. On the basis of this message, the disturbed carrier frequency values are then updated by non-disturbed carrier frequency values from the N-M carrier frequency values. The table is updated in the same way as well as in the corresponding base station. It is to be emphasized again that the base station and the mobile station respectively.

The aforementioned method steps are implemented in corresponding devices in the inventive apparatus. The inventive apparatus for the transmission of information in various carrier frequencies with a frequency hopping method can thereby be implemented, for example, in a mobile station or in a base station of a mobile radio telephone system.

DESCRIPTION OF THE DRAWINGS

The invention is now explained in greater detail on the basis of an exemplary embodiment and with reference to the accompanying drawings.

FIG. 1 is a schematic diagram of a mobile radio telephone transmission system with an inventive fixed station;

FIG. 2 is a graph in perspective view of a time frame of a data transmission standard as employable given the present invention;

DETAILED DESCRIPTION OF THE PREFERRED EMBODIMENTS

Figure 3:
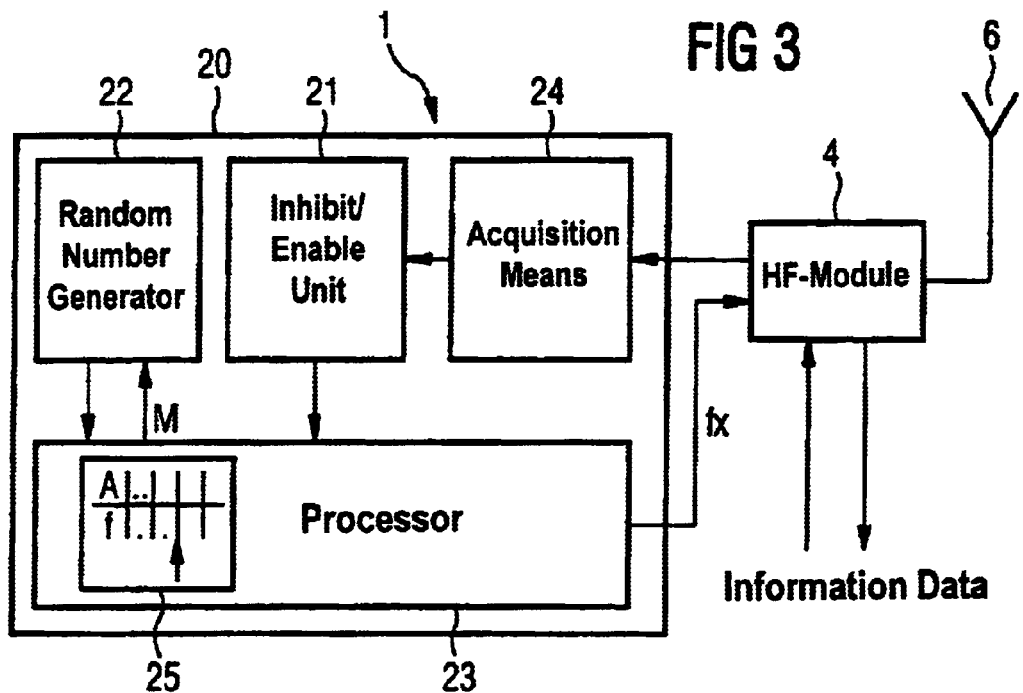
FIG. 3 is a functional block diagram showing details of the internal structure of an inventive base station.

With reference to FIG. 1, the general structure of a mobile radio telephone transmission shall be explained first. As generally standard, the arrangement for radio transmission of data comprises a fixed station 1 and a plurality of mobile parts (mobile stations), cordless telephones 2, 3 ... The fixed station 1 is connected to the fixed network with a terminal line 10. An interface means (not shown) can be provided for communication between the fixed station and the terminal line 10. The fixed station 1 comprises an antenna 6 with which, for example, a communication with the mobile part 2 occurs via a first radio transmission path 8 or with the mobile part 3 via a second radio transmission path 9. The mobile parts 2, 3 ... comprise a respective antenna 7 for the reception or, respectively, the transmission of data. In FIG. 1, the condition is schematically shown wherein the fixed station 1 actively communicates with the mobile part 2 and thus exchanges data therewith. The mobile part 3, in contrast, is in what is referred to as the idle locked mode wherein, standby-like, it waits for a call from the fixed Station 1. In this condition, the mobile part 3 does not communicate with the fixed station 1 in the actual sense but receives the data of, for example, a time slot from the fixed station 1 at periodic intervals in order to be able to resynchronize its carrier frequencies fx.

The internal structure of the fixed station 1 is schematically shown in FIG. 1. The voice information data are supplied to a RF module 4 that is driven by a carrier frequency sequence unit. The exact structure of an inventive fixed station 1 shall be described later.

With reference to FIG. 2, a transmission standard shall now be explained of a type that can be employed given the present invention. As can be seen from FIG. 2, data are transmitted on a plurality of carrier frequency $fx^1$–10 thereof being shown—in chronological succession in a plurality of time slots, 24 time slots Zx in the illustrated case, being transmitted in a time-division multiplex method in TDMA (time division multiple access). In the illustrated case, work is thereby carried out in a duplex mode, i.e. following the transmission of the first 12 time slots Zx, a switch is made to reception and the twelve time slots (Z13 through Z24) are received from the fixed station in the opposite direction.

When what is referred to as the DECT standard is employed for the transmission, the time duration of a time frame amounts to 10 ms and 24 time slots Zx are provided, namely 12 time slots for the transmission from the fixed station to mobile parts and another 12 time slots Zx for the transmission from the mobile parts to the fixed station. According to the DECT standard, ten carrier frequencies fx are provided between 1.88 GHz and 1.90 GHz.

Of course, other frame structures are also suitable for employment in the present invention, for example those wherein the number of time slots per frame is cut in half compared to the DECT standard.

The present invention is particularly employed for transmissions in what is referred to as the 2.4 GHz-ISM (Industrial, Scientific, Medical) frequency band. The generally accessible ISM frequency band comprises a bandwidth of 83.5 MHz. According to the rule FCC part 15, at least 75 carrier frequencies must be distributed over these 83.5 MHz. A division of the bandwidth of 83.5 MHz onto 96 carrier frequencies is especially advantageous, i.e. a channel spacing of 864 kHz. The aforementioned frequency bands and standards are cited merely as examples. A fundamental precondition for an applicability in the present invention is merely that what is referred to is a frequency hopping spread spectrum is employed, i.e. that a plurality of carrier frequencies are available and that the carrier frequency selected for the transmission is changed from time to time. A precondition for such a change is that the data are transmitted in time slots Zx (time-division multiplex method). Thus, for example, the DECT standard is suitable, as is any other modified standard based on this DECT standard.

With reference to FIG. 3, the internal structure of an inventive fixed station 1 shall now be explained in greater detail. As can be seen in FIG. 3, information data are supplied to the RF module 4 when transmission is to be carried out from the fixed station 1 to a mobile part 2, 3 ... with the antenna 6, and the RF module 4 outputs information data when data when data are received from mobile parts. The RF module 4 modulates the digitally encoded information data onto a carrier frequency fx. The carrier frequency fx to be currently employed is thereby prescribed by a carrier frequency sequence unit, which is referenced 20 overall. An acquisition means 24 to which the demodulated signal is supplied from the RF module 4 is provided in the carrier frequency sequence unit 20. Disturbance thereby means that either a disturbance in the actual sense or an occupancy by some other transmitter is present. A disturbance in the sense the present specification can thus be acquired in that a received signal is demodulated on a carrier frequency and acquired as to whether a signal level is present on this carrier frequency or not. A disturbed carrier frequency is thus a carrier frequency onto which a signal is modulated that exceeds a specific threshold.

Alternatively to the blocking, the A-CRC value, the X-CRC value, a loss of synchronization or the RSSI value can be utilized.

On the basis of the demodulated signal from the RF module 4, for example, the acquisition means 24 thus determines how high the signal part modulated onto a specific carrier frequency fx is. When the acquired signal part lies above a predetermined limit value, the acquisition means 24 outputs a disturbance acquired signal to an inhibit/enable unit 21. Dependent on the disturbance acquisition signal from the acquisition means 24, the inhibit/enable unit 21 forwards an inhibit/enable information to a processor 23. This inhibit/enable information indicates which of the carrier frequencies fx are inhibited or, respectively, re-enabled due to the acquisition of a disturbance by the acquisition means 24, as shall be explained later.

The acquisition means 24 and the inhibit/enable means 21 thus creates an dependent procedure with which disturbed frequencies can be inhibited and re-enabled. In addition to being supplied with the inhibit/enable information from the inhibit/enable unit 21, the processor 23 is supplied with a sequence from a random generator 22. On the basis of an implied random algorithm, the random generator 22 generates a randomly distributed sequence of carrier frequency values within the useable frequency band. The random generator 22 thus implements a procedure independent of the procedure of frequency blocking for the case of a disturbance. The processor 23, finally, outputs a drive signal to the RF module 4 that prescribes the carrier frequency value to be employed for the RF 15 module 4.

The processor 23 comprises a table 25' provided in a memory whose function and administration shall be explained later.

Figure 4:
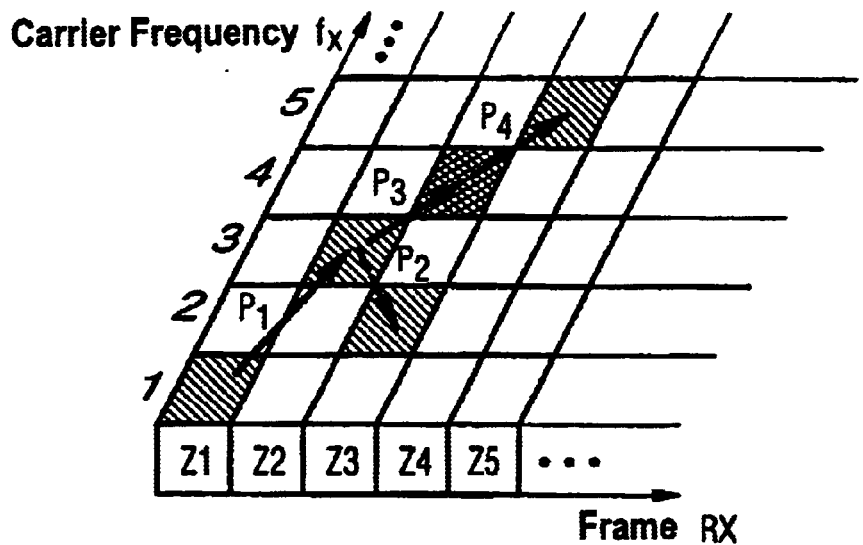
FIG. 4 is a graph in perspective view of a frequency hopping spread spectrum system, particularly for the case of a jammer-evasion mode as well.

With reference to FIG. 4, the operation of a fixed station 1 or, respectively, the method shall be explained in greater detail. As shown in FIG. 4, for example, a carrier frequency f1 is employed during a frame Rx of a mobile radio transmission, as shown shaded in FIG. 4. This frequency f1 is thus the first value of the sequence generated by the random generator 22 that is supplied to the processor 23, which in turn correspondingly drives the RF module 4. Let it be assumed for the frame R2 that the random generator 22 prescribes a frequency hop P1 onto a carrier frequency f3 on the basis of its calculated frequency.

Let the case now be assumed that the acquisition means 24, for example in a prior transmission, has acquired that the carrier frequency f2 is disturbed, and the acquisition means 24 has thus forwarded a corresponding disturbance signal to the inhibit/enable unit 21 that in turn indicates an inhibit of the frequency f2 to the processor 23. Let it also be assumed that the random generator 22 prescribes the carrier frequency f2 previously acquired as disturbed on the basis of its identified sequence for the frame R3. Proceeding from the coincidence of the prescribed carrier frequency f2 according to the sequence of the random generator 22 and, simultaneously, the inhibit signal from the inhibit/enable unit 21 for the same carrier frequency f2, the processor 23 now replaces the carrier frequency f2 that was actually prescribed but was acquired as disturbed for the frame R3 by a carrier frequency that was not acquired as disturbed by the acquisition means 24, for example the carrier frequency f4, as indicated by the frequency hop arrow P3. Instead of the carrier frequency 2 actually prescribed by the sequence, thus, the RF module 4 is driven onto the alternate carrier frequency f4. By replacing the carrier frequency acquired as disturbed, thus, a modified sequence of carrier frequencies is created. The modified sequence thereby comprises only undisturbed carrier frequencies. As a result thereof that a carrier frequency acquired as disturbed is replaced and not skipped, the positions of the undisturbed carrier frequencies in the modified sequence upon transition to the following carrier frequency is not modified compared to the original sequence.

The basis of this modified sequence composed of only undisturbed carrier frequency fx is thus formed by two superimposed, mutually independent procedures (random generator 22 or, respectively, inhibit/enable unit 21). This inhibit can be in turn canceled by the inhibit/enable unit 21 as soon as a renewed acquisition by the acquisition means 24 indicates that the previously disturbed carrier frequency is now no longer disturbed. In this case, the inhibit/enable unit 21 provides an enable signal to the processors 23 that indicates that the processor 23 now no longer need replace the previously disturbed carrier frequency by a different carrier frequency.

Alternatively, the inhibit/enable unit 21 can automatically output an enable signal to the processor 23 without renewed acquisition by the acquisition means 24 as soon as a predetermined time duration has expired. Each of said procedures thus independently assures that the entire, predetermined frequency spectrum is utilized and uniformly distributed. Standards are thus adhered to by the adaptation of the times in the procedure for inhibiting frequencies.

Let the U.S. rule FCC part 15 be cited as an example of such a standard. This rule prescribes that at least 75 different frequencies must be used given a frequency hopping spread spectrum system within a time span of thirty seconds. Each frequency is thereby allowed to be used for a maximum of 0.4 seconds in 30 seconds. Over and above this, all frequencies must be used equally distributed on average.

The fixed station 1 is the master in the frequency allocation, i.e. the random generator in a mobile part is initialized at the beginning of a connection setup with the status of the random number generator 22 of the fixed station 1. Subsequently, the random number generators in a mobile part 2, 3 . . . and in the fixed station 1 generate the same carrier frequency values synchronously in the frame clock and autonomously from one another.

The mobile part comprises essentially the same structure as the fixed station 1. Like the fixed station 1, the mobile part likewise comprises a carrier frequency sequence unit 20 with a random number generator 22 and a processor 23 that contains a table 25. The table 25 is identical to the table 25 of the fixed station 1. The mobile station, however, does not comprise the acquisition means 24 and the inhibit/enable means 21. Disturbed carrier frequencies are thus only acquired in the fixed station or, respectively, base station and communicated to the corresponding mobile stations. An acquisition of disturbed carrier frequencies can also occur in the mobile stations, whereby the mobile stations comprise the structure shown in FIG. 3 in this case. The method for transmitting information or, respectively, data in the corresponding carrier frequencies in the mobile stations corresponds to the corresponding method in the base station.

The procedure for frequency blocking that is implemented by the acquisition means 24 and the inhibit/enable unit 21 employs a unidirectional protocol on the air interface during the entire connection time between the fixed station 1 and a mobile part 2, 3 . . . When the acquisition means 24 finds one of the ultimately possible frequencies fx of the fixed station 1 to be disturbed, then the fixed station 1 thus informs all mobile parts with which it is maintaining an active connection that this disturbed frequency—when it is generated by the frequency of the random number generator—is to be replaced by another carrier frequency acquired as being not disturbed. The frequency inhibit is in turn canceled by the inhibit /enable unit 21 when the inhibited carrier frequency is again suitable for the transmission or, respectively, when it was inhibited for longer than a previously defined time.

Figure 5:
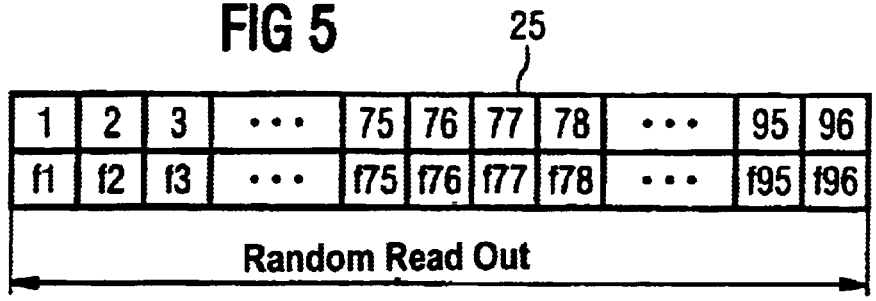
FIG. 5 shows a table from which carrier frequency values are randomly read on the basis of a random sequence.

It can be seen in FIG. 3 that, for example, a table 25 provided in a memory is allocated to the processor 23. With reference to FIG. 3 as well as to FIG. 5 through FIG. 11, it shall now be explained how the carrier frequencies fx are inventively offered. As can be seen in FIG. 5, all carrier frequencies fx available overall are entered into a table 25, for example 96 carrier frequencies fx.

As can be seen in FIG. 5, the carrier frequency values $f_1$ through $f_6$ are entered in corresponding addresses 1 through 96 of the table 25 in their numerical sequence. This sequence of the carrier frequency values fx, however, is only envisioned as an example. The carrier frequency values fx can, for example, be stored in the table 25 in a different sequence.

The number of carrier frequency values fx present overall, 96 in the present example, is referenced N. According to U.S. rule FCC part 15, at least 75 different frequencies must be used in a time span of 30 seconds.

Figure 6:
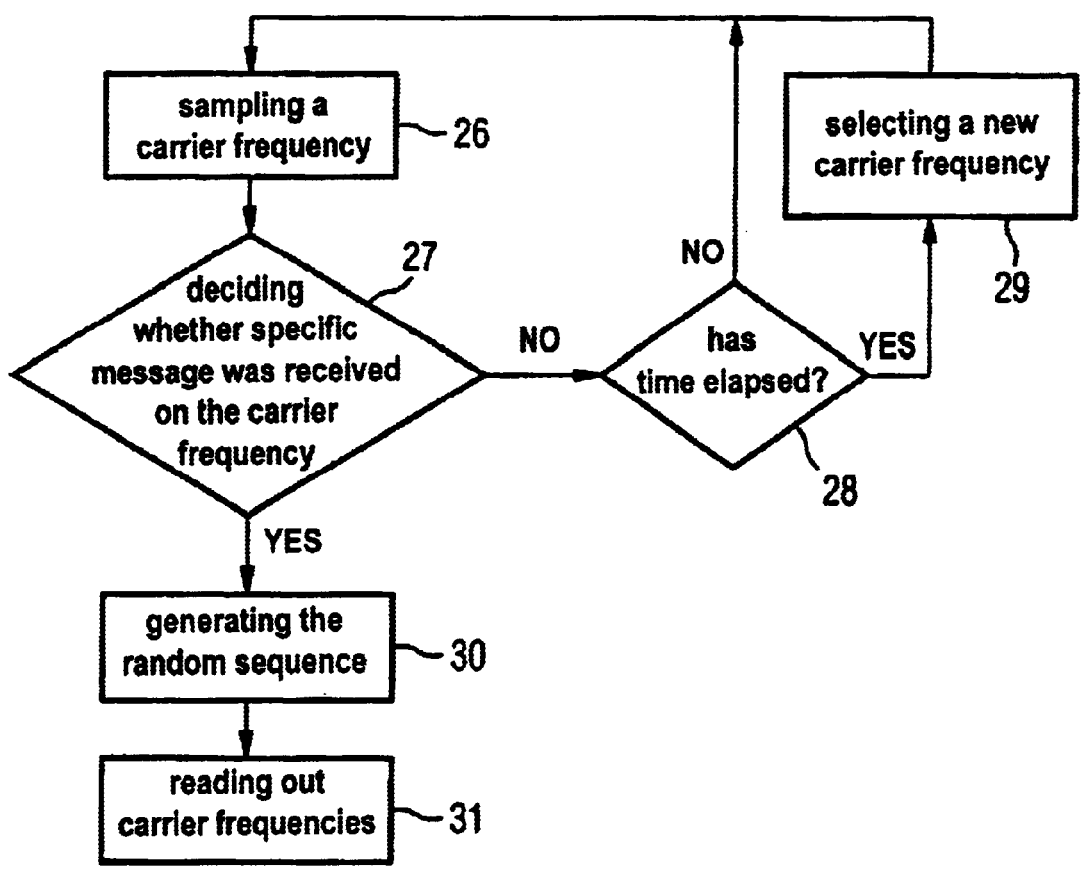
FIG. 6 shows a flow chart that shows a method for setting up a connection between or, respectively, for the synchronization of two mobile radial telephone units.

It is assumed in the example explained in FIGS. 5 and 6 that no carrier frequency is disturbed, so that all 96 carrier frequencies can be employed for the transmission of data. Given the example explained in FIGS. 7 and 8, only a part M of the 96 carrier frequencies, namely 75 carrier frequencies, are transmitted; these, when one of them is disturbed, can be replaced from the remaining 21 carrier frequencies.

The table 25 permanently stored in the table 25' in the mobile station and in the base station or, respectively, fixed station is read out with a random number generator 22 that is identical for the base station and the fixed station. The carrier frequency values fx read out in the processor 23, which is likewise respectively present in the base station and in the mobile station, are converted into the corresponding carrier frequencies in the RF module 4. Subsequently, data or, respectively, information are transmitted in the carrier frequencies. Each carrier frequency value fx is present only a single time in the table 25.

FIG. 6 shows a flow chart that shows the setup of a connection between a mobile station and a base station or, respectively, the synchronization of a mobile station to a base station. The executive sequences are identical in both instances. The method execution shown in FIG. 6 is, in particular, implemented in the mobile stations that are dependent on the respective base station. A corresponding means in the respective mobile radial telephone unit that, for example, can be a mobile station is allocated to each of the method steps shown in FIG. 6. In a first step 26, a selected carrier frequency is sampled in a corresponding means. In a next step 27, a determination or, respectively, decision is made in a corresponding means as to whether a specific message was received on the selected carrier frequency. The specific message can thereby, for example, be a $N_t$ message in the A-field of the DECT standard. Other, corresponding messages can be employed in other standards. When it is found in step 27 that the specific message was not received, a check is carried out in a step 28 in a corresponding means as to whether a specific time duration t has elapsed. When the specific time duration t has not elapsed, then the sampling of the selected carrier frequency is continued in step 26. When the time duration t has elapsed, then a new carrier frequency is selected in a step 29 in a corresponding means. The new carrier frequency is correspondingly sampled in the step 26.

When the decision in step 27 is positive, i.e. when it is found that the specific, anticipated message was received on the carrier frequency, the random number sequence permanently prescribed by the random number generator 22 is generated in a corresponding means in a step 30. The specific, received message is thereby employed to start the generation of the random number sequence in the random number generator 22 at the position at which the mobile unit from which the specific message was received is located at the moment. This is necessary in order to assure that the two, data-exchanging mobile radio telephone units are synchronized with one another and employ the random sequence of carrier frequencies for the transmission of data synchronously with one another. In step 30, thus, the random number sequence is generated beginning with the position prescribed by the specific message and is employed for the readout of carrier frequency values proceeding from the corresponding address in the table 25. The readout of carrier frequency values fx ensues in a step 31 in a corresponding means in the processor 23 of the corresponding mobile radio telephone u nit. The random number values that are generated by the random number generator 22 are thereby converted into address values between 1 and N, i.e. into address values between 1 and 96 in the present example, with which the carrier frequency values fx are read out from the table 25.

Figure 7:
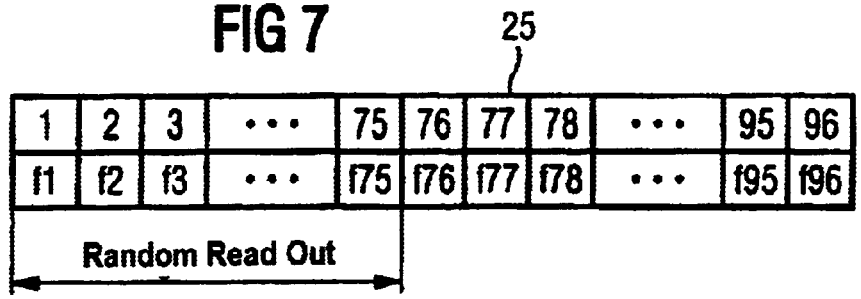
FIG. 7 shows a table from which only a part of the carrier frequency values is read out randomly on the basis of a random sequence.

FIG. 7 shows a table 25 wherein only a part M=75 of the total of N=96 carrier frequency values fx are read out from corresponding addresses 1 through 75. As was already explained above, for example, at least 75 different frequencies must be used in a time span of 30 seconds according to U.S. rule FCC part 15. This requirement is satisfied by the readout of the first 75 carrier frequency values from the corresponding addresses 1 through 75 from the table 25 according to FIG. 7. The remaining carrier frequency values from the addresses 76 through 96 can thereby be employed for replacing or, respectively, updating disturbed carrier frequency values in the first 75 carrier frequency values. The random number generator 22 in the mobile station and the base station therefore outputs no sequences that comprise N different values; on the contrary, it is adequate when it outputs M different values corresponding to the carrier frequencies actually available. As was explained with reference to FIG. 3, for example, one or more disturbed carrier frequencies are thereby identified in a fixed station. In response thereto, the fixed station outputs a corresponding signal to the mobile station regarding which frequencies are disturbed. The carrier frequency values in the table 25 in the base station and the mobile station that correspond to disturbed carrier frequencies are subsequently replaced by non-disturbed carrier frequency values from the addresses 76 through 96. Of course, this replacement and updating of the disturbed carrier frequency values must ensue synchronously in the base station and in the mobile station. Further, the identification of disturbed carrier frequencies could also ensue in the respective mobile station that sends a corresponding message to allocated base stations.

Figure 8:
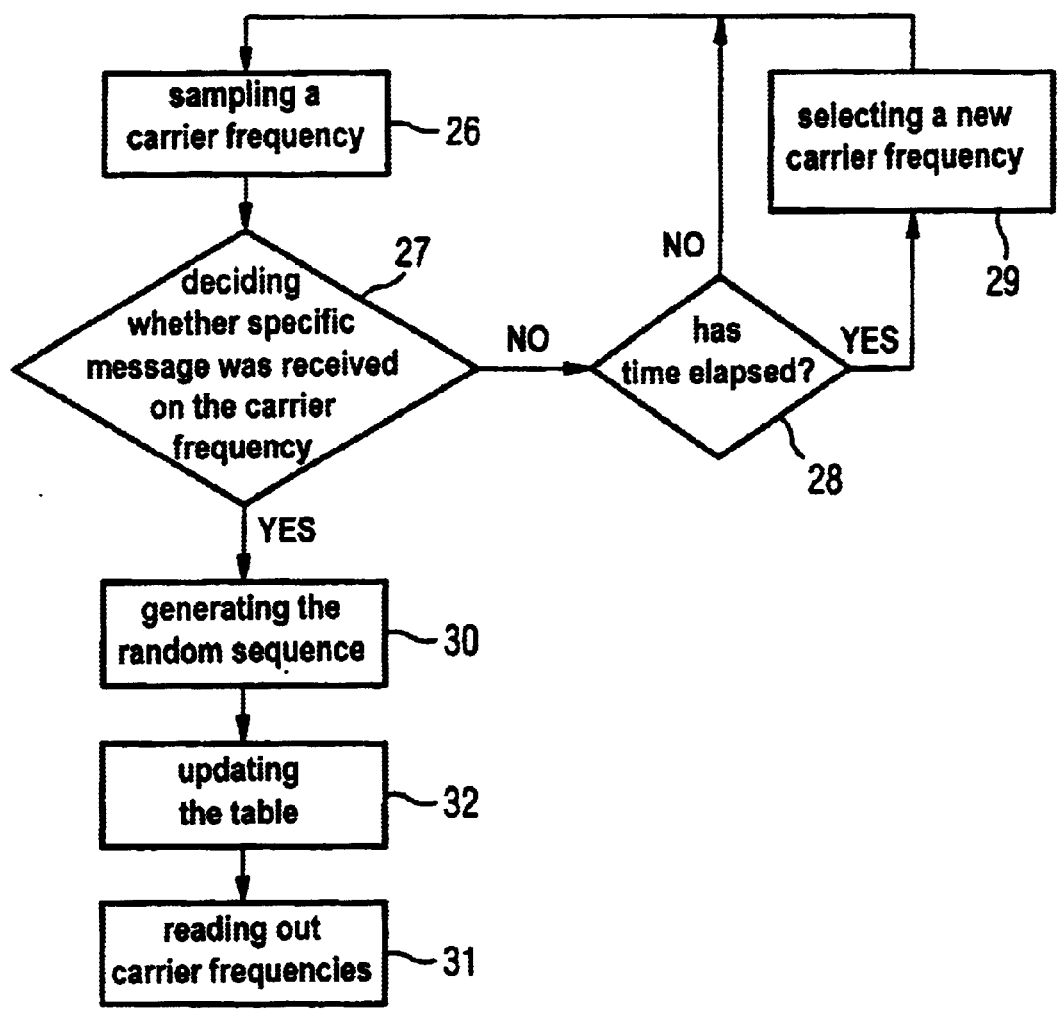
FIG. 8 shows a flow chart that illustrates a method for setting up a connection between or, respectively, for the synchronization of, for example, two mobile radio telephone units, whereby disturbed carrier frequency values can be replaced by non-disturbed carrier frequency values.

FIG. 8 shows a flow chart that explains the setup of a connection between mobile radio telephone units or, respectively, the synchronization of mobile radio telephone units when only a part M of the existing N carrier frequency values is read out from the table 25. The corresponding method steps of the flow chart of FIG. 5 have corresponding devices in the respective mobile radio telephone unit allocated to them.

In a first step 26, a selected carrier frequency is sampled in a corresponding means. In a step 27, a decision is made in a corresponding means as to whether a specific message was received on the selected carrier frequency. When this is not the case, a finding is made in a step 28 as to whether a time duration t has elapsed. The step 27 and the step 28 can be implemented in a common step in a common means. When it is found that the time duration t has not elapsed, then the selected carrier frequency is re-sampled in the step 26. When it is found that the time duration t has elapsed, then a new carrier frequency is selected in a step 29 in a corresponding means and is correspondingly sampled in the step 26.

When the decision in the step 27 is positive, i.e. when it is found that a specific message is received on the sampled carrier frequency, then the random sequence is generated by the random number generator 22 upon employment of the received message. The specific message can thereby, for example, be the $N_t$ message in the A-field in the DECT standard. In other standards, of course, other messages can be employed. The specific message thereby informs the random number generator 22 regarding the position proceeding from which the random sequence should be started. In other words, the specific message indicates the position at which the random number generator 22 of that mobile radio telephone unit that sends the specific message is located at the moment, so that the random number generator 22 of the receiving mobile radio telephone unit to be synchronized can generate the random sequence proceeding from the same position.

In a step 32, the table is updated in a corresponding means on the basis of a further, received message. When, for example, the base station finds that a specific carrier frequency is disturbed, then it communicates a message to, for example, a receiving mobile station as to which carrier frequency is disturbed and with which carrier frequency from the addresses 76 through 96 of the table 25 the disturbed carrier frequency value should be replaced. In a step 31, the carrier frequencies are read out from the addresses 1 through 75 of the table 25 in a corresponding means.

Figure 9:
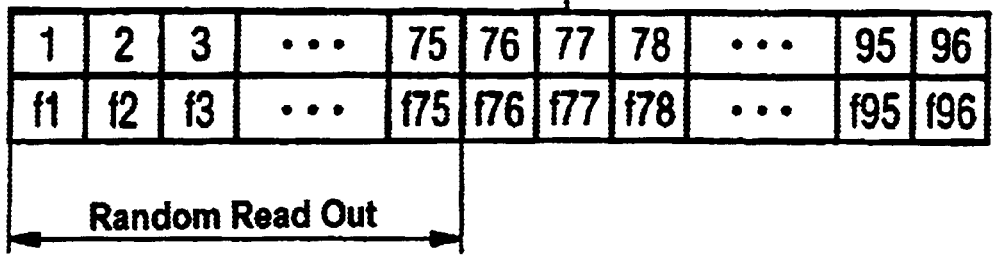
FIG. 9 shows a table from which only a part of the carrier frequency values are randomly read out on the basis of a random sequence.
Figure 10:
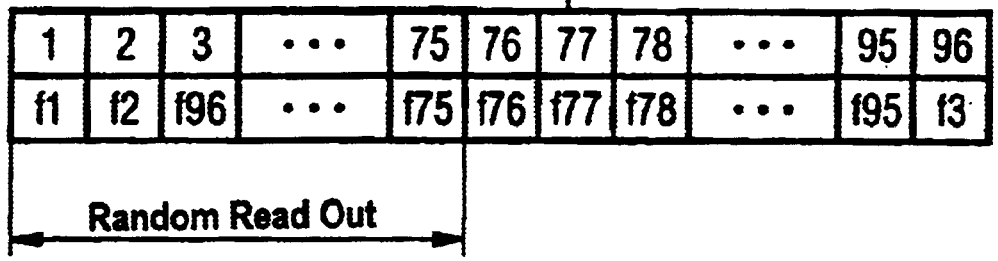
FIG. 10 shows the table from FIG. 9, whereby a disturbed carrier frequency value from the carrier frequency values that are read out is replaced by a non-disturbed carrier frequency value.
Figure 11:
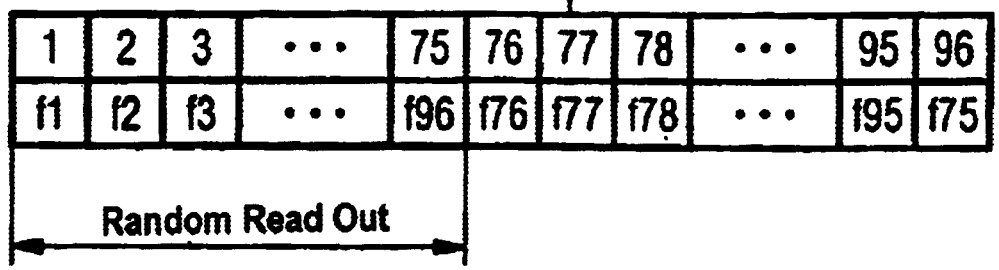
FIG. 11 shows the table of FIG. 10, whereby another disturbed carrier frequency value is replaced by a non-disturbed carrier frequency value.

FIGS. 9 through 11 show how disturbed carrier frequency values in the addresses 1 through 75 of the table 25 are replaced by non-disturbed carrier frequency values from the addresses 76 through 96. FIG. 9 thereby shows a table 25 that corresponds to the table 25 of FIG. 7. A part M, for example 75, of carrier frequency values fx is read out from corresponding addresses 1 through M on the basis of the random number sequence generated by the random number generator 22. When it is found that, for example, the carrier frequency that corresponds to the carrier frequency value $f_3$ is disturbed, then the carrier frequency values $f_{96}$, which is not disturbed, is substituted for the carrier frequency value $f_3$, as shown in FIG. 10. The non-disturbed carrier frequency value $f_{96}$ is thus located at the address 3, and the disturbed carrier frequency value $f_3$ is located at the address 96. Since the addresses 1 through 75 are always read out on the basis of the random sequence, it is thus assured that only non-disturbed carrier frequencies are employed for the transmission of data. When it is also found that the carrier frequency that corresponds to the carrier frequency value $f_{75}$ is disturbed and that the carrier frequency value $f_3$ is no longer disturbed, then the carrier frequency value $f_3$ is first reset to its original address 3, and the carrier frequency value $f_{96}$ is reset to its original address 96. Subsequently, the disturbed carrier frequency value $f_{75}$ is set to the address 96, and the non-disturbed carrier frequency $f_{96}$ is set to the address 75, as shown in FIG. 11. Since the table is permanently prescribed, it is thus assured that the carrier frequency values are always present at their fixed addresses except when they are disturbed.

The values N=96 and M=75 are merely exemplary in the above description and can be replaced by other values dependent on the requirements of the standard to be met.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for transmission of information in various carrier frequencies with frequency hopping, comprising the following steps:
    offering a table with a plurality of n possible carrier frequency value fx in addresses 1 through N of the table;
    generating a sequence of random values;
    reading out at least a part M of the N carrier frequency values fx from corresponding addresses of the table on a basis of the generated sequence of random values, M≦N, and transmitting information in the corresponding carrier frequencies, implementing the following steps for setup of a connection:
    sampling a carrier frequency;
    deciding whether a message containing at least an initialization information was received on this carrier frequency during a specific time span;
    when the deciding step is negative, selecting a new carrier frequency and sampling said new carrier frequency; and
    when the deciding step is positive, generating the sequence of random values upon employment of the initialization information.

2. The method according to claim 1, further comprising the step of converting, the generated sequence of random values into address values between 1 and N with which the carrier frequency values are read from the table.

3. The method according to claim 1, comprising the following steps:
    implementing a synchronization including the steps of sampling a carrier frequency;
    deciding whether a message was received on said carrier frequency during a specific time span;
    when the deciding step is negative, selecting a new carrier frequency and sampling said new carrier frequency;
    when the deciding step is positive, generating the sequence of random values upon employment of the message.

4. The method according to claim 1, further comprising the steps of reading out a part M of the N possible carrier frequency values from the table, employing remaining N-M carrier frequency values for replacing disturbed carrier frequency values of the M carrier frequency values.

5. The method according to claim 4, further comprising the step of updating from the N-M carrier frequency values before the read-out upon replacement of the carrier frequency values that correspond to disturbed carrier frequencies.

6. An apparatus for transmission of information in various carrier frequencies with a frequency hopping method, comprising:
    a table with a plurality of n possible carrier frequency value fx in addresses 1 through N of the table;
    a random value generator for generating a sequence of random values;
    a means for reading out at least a part M of the N carrier frequency values fx from corresponding addresses of the table on a basis of the generated sequence of random values, M≦N;
    a transmitting apparatus for transmitting information in the corresponding carrier frequencies,
    a means for setup of a connection that includes:
        means for sampling a carrier frequency; and
        means for deciding whether a message containing at least an initialization information was received on said carrier frequency during a specific time span configured such that, when the decision is negative, a new carrier frequency is selected and said new carrier frequency is sampled, and, when the decision is positive, the sequence of random values is generated upon employment of at least the initialization information.

7. The apparatus according to claim 6, further comprising:
    a means for converting the generated sequence of random values into address values between 1 and N with which the carrier frequency values are read from the table.

8. The apparatus according to claim 6, further comprising a means for synchronization including:
    means for sampling a carrier frequency;
    means for deciding whether a message containing at least an initialization information was received on said carrier frequency during a specific time span configured such that, when the decision is negative, a new carrier frequency is selected and said new carrier frequency is sampled, and, when the decision is positive, the sequence of random values is generated upon employment of at least the initialization information.

9. The apparatus according to claim 6, wherein the means for readout reads a part M of the N possible carrier frequency values from the table, the remaining N-M carrier frequency values being employed for replacing disturbed carrier frequency values of the M carrier frequency values.

10. The apparatus according to claim 9, further comprising a means for updating the table from the N-M carrier frequency values before the read-out upon replacement of the carrier frequency values that correspond to disturbed carrier frequencies.

* * * * *